United States Patent

Hornsby

[15] 3,687,439
[45] Aug. 29, 1972

[54] AIR BAG SUSPENSION SYSTEM FOR RAILWAY VEHICLES

[72] Inventor: Guyton E. Hornsby, 4001 Rose Land, Annandale, Va. 22003

[22] Filed: Aug. 4, 1970

[21] Appl. No.: 60,861

[52] U.S. Cl. ..................267/65, 105/197, 105/453
[51] Int. Cl. ...............................................F16f 5/00
[58] Field of Search.........267/32, 11, 65; 105/197 B, 105/453

[56] References Cited

UNITED STATES PATENTS

| 2,537,637 | 1/1951 | Candlin, Jr. et al....105/193 B |
| 3,461,816 | 8/1969 | Beck..............................267/3 |

FOREIGN PATENTS OR APPLICATIONS 396,463   12/1909   France.........................267/65

*Primary Examiner*—James B. Marbert
*Attorney*—John B. Dickman, III

[57] ABSTRACT

An air bag suspension system for railway vehicles in which the wheel supporting axles are vertically slidably connected to longitudinal support beams with an air bag disposed between the top portion of the axle and a corresponding portion of the beam. A similar air bag arrangement is employed in the connection between the load supporting member and the beam.

1 Claim, 4 Drawing Figures

Patented Aug. 29, 1972

INVENTOR.
GUYTON E. HORNSBY
BY
John B. Dickman III
AGENT.

Patented Aug. 29, 1972

INVENTOR.
GUYTON E. HORNSBY
BY
John B. Dickman
AGENT.

AIR BAG SUSPENSION SYSTEM FOR RAILWAY VEHICLES

The present invention generally relates to railway vehicles and more particularly to an air bag suspension assembly for cushioning forces transmitted between the wheels and load supporting component such as a boxcar, locomotive, caboose or other vehicle.

An object of the present invention is to provide an air bag suspension for railway vehicles in which the ends of the axle are received in a vertical slot type guide with an air bag disposed between the top of the axle and the upper end of the guide in a longitudinal beam which forms a part of the wheel truck or unit of a railway vehicle.

Another object this invention is to provide an air bag assembly between a load supporting element of the railway vehicle and a central portion of the longitudinal wheel supporting beam to cushion forces transmitted therebetween.

Still another object of this invention is to provide an air bag suspension for railway vehicles which is simple in construction, easy to install, long lasting and dependable, and relatively inexpensive to manufacture, operate and maintain.

The structure, organization, and operation of the invention will now be described more specifically with reference to the accompanying drawings, wherein.

Figure 1:
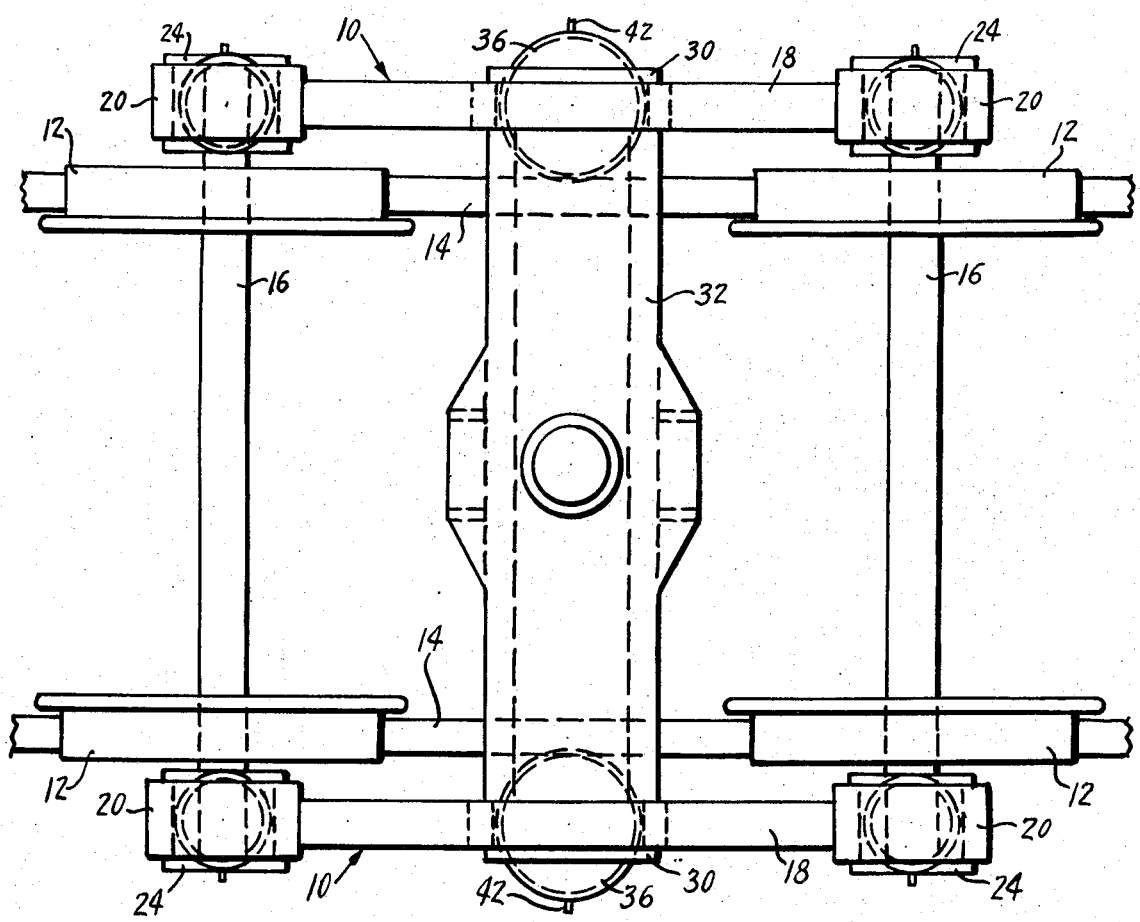
FIG. 1 is a plan view of a wheel assembly of a railway vehicle with the air bag suspension assembly of the present invention incorporated therein.
Figure 2:
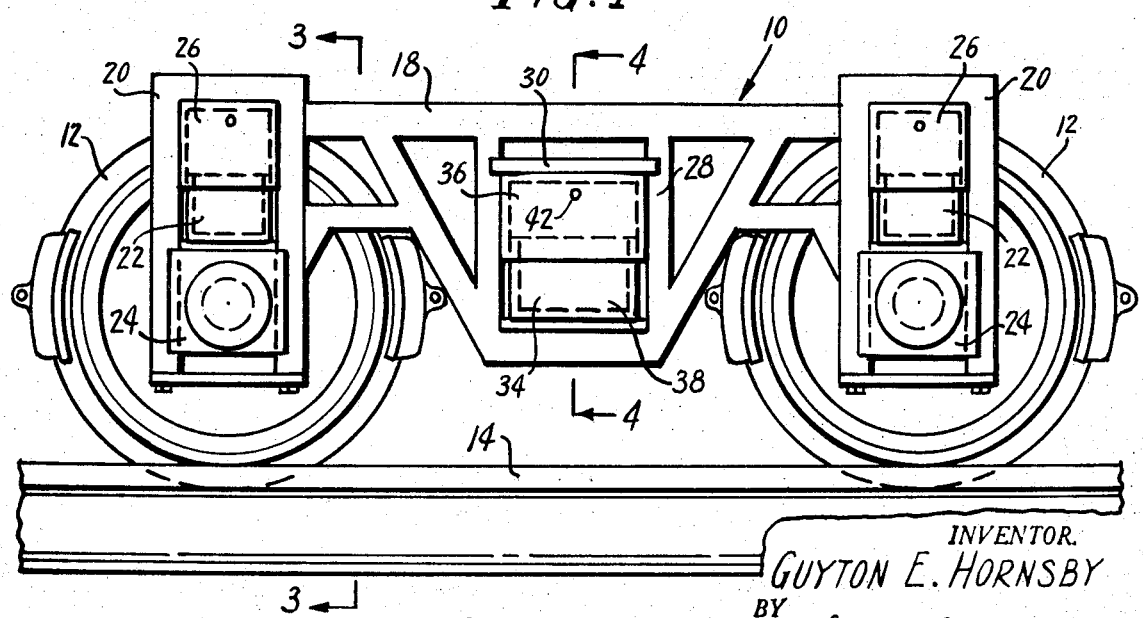
FIG. 2 is a side elevational view thereof.
Figure 3:
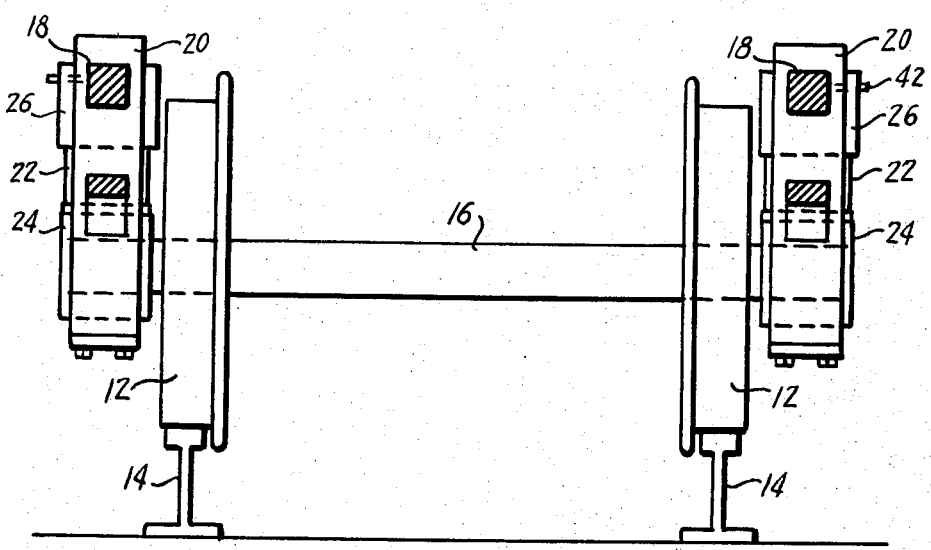
FIG. 3 is a transverse sectional view taken along section line 3—3 on FIG. 2.

Referring now specifically to the drawings, the wheel assembly or truck of the railway vehicle is generally designated by numeral 10 and includes the usual flanged supporting wheels 12 adapted to engage railroad rails 14 in a conventional manner. The wheels 12 are supported from and rigidly interconnected by an axle 16 extending between the pairs of wheels located at both ends of a pair of longitudinally extending beams 18.

Each end of each beam 18 is provided with a vertically disposed guide 20 in the form of a vertical slot 22 which slidably receives a support bearing assembly 24 for the axle 16 to enable guided and limited vertical movement between the axle and beam.

Disposed between the bearing assembly 24 and the top of the slot 22, which is closed, is an air bag 26 which cushions the upward movement of the axle 16 and supports the load forces transmitted between the axle and beam thus reducing destructive shock forces and providing for longer life for all of the components of the railway vehicle.

The beam 18 is a framework having a vertically disposed central guide 28 in the form of a slot which slidably receives and guides the ends 30 of a transverse load supporting member 32 which supports a boxcar, locomotive or other railway vehicle in a well known manner. An air bag 34 is disposed between the bottom of guide 28 and the ends 30 of member 32 thus cushioning forces transmitted therebetween.

Figure 4:
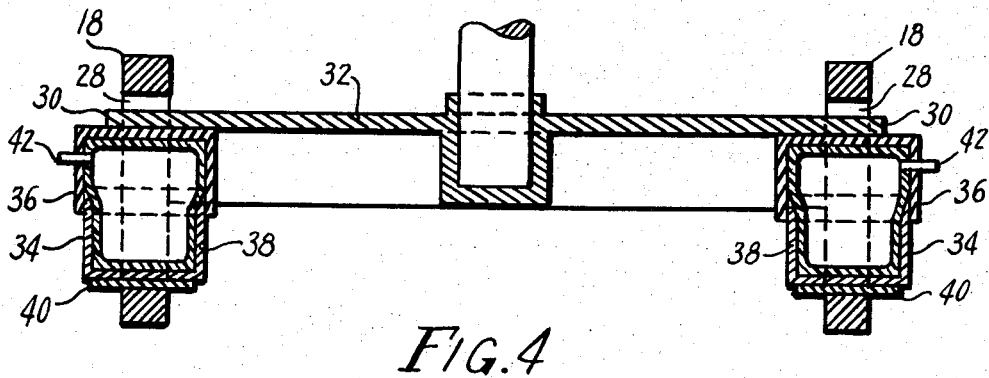
FIG. 4 is a transverse sectional view taken along section line 4—4 on FIG. 2.

FIG. 4 illustrates the details of construction of an air bag 34 which includes telescopic members 36 and 38 enclosing a flexible and resilient bag or envelope 40 having an inflating and deflating valve 42 associated therewith to vary the cushioning characteristics thereof by varying the pneumatic pressure. Any suitable air bag structure may be employed having strength characteristics commensurate with the requirements for use on a railway vehicle. The air cushion reduces various load and impact forces transmitted between the load carrying body or components of the vehicle and the wheels and rails which prolongs the life expectancy of not only the rolling stock or vehicles but also the rails and roadbed. Conventional bearing structures and lubrication features may be incorporated into the device wherever necessary.

It will be understood that I desire to comprehend within my invention such modifications as come within the scope of the claims and the invention.

I claim:

1. In a suspension system for a railway vehicle of the type having rail engaging flanged wheels journalled at each end of a pair of longitudinal beams by a pair of transverse axles, that improvement comprising a vertical guide slot on each end of each beam receiving the axle, each end of each axle having a bearing assembly slidably received in the guide slot, air bag means comprising a pair of upper and lower telescopic tubular members having an inflatable flexible bag disposed therein, said air bag engaging the top of said bearing assembly, an inflation and deflation valve passing through one of the telescopic members and attached to said bag, said lower member fitting inside said upper member and telescoping therein when compression occurs.

* * * * *